Jan. 18, 1966 P. H. BROOKS 3,229,304
ARCHERY FINGER GUARD
Filed Jan. 7, 1964 2 Sheets-Sheet 1
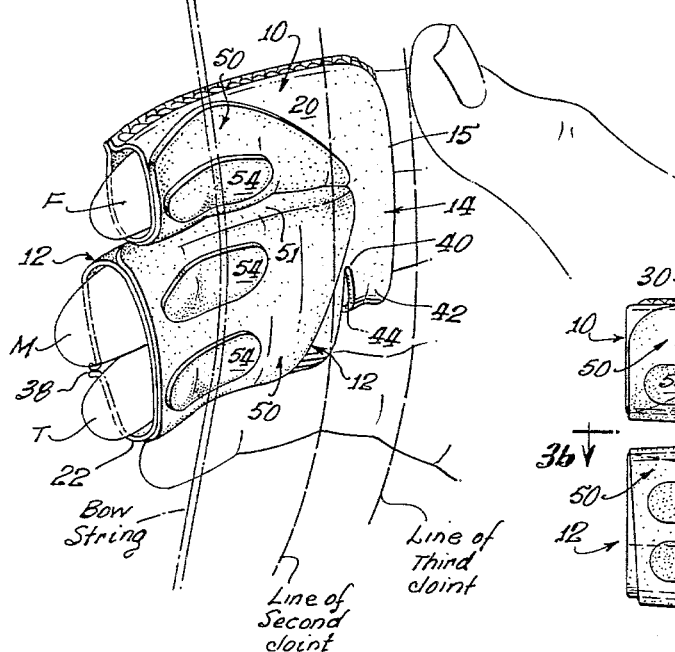
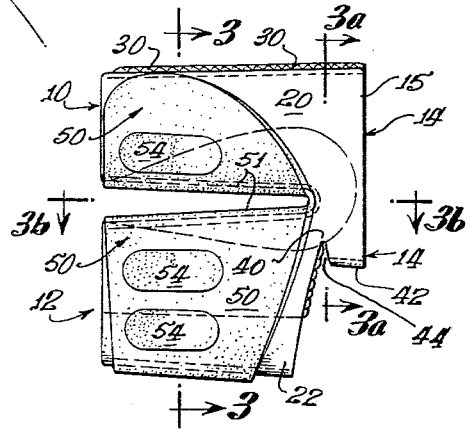
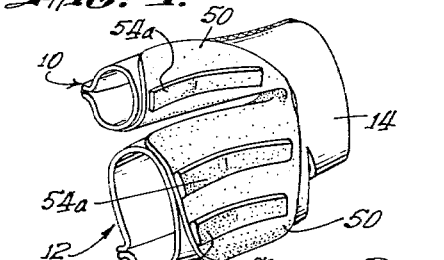
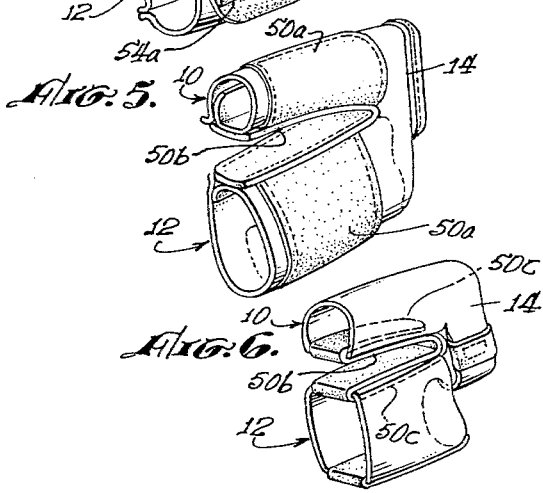
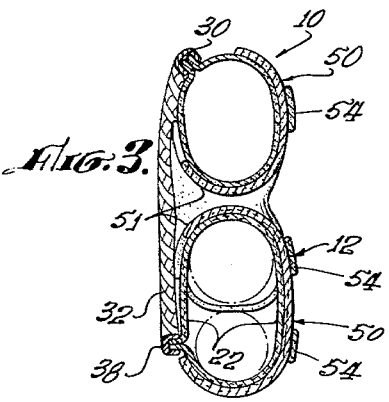
INVENTOR.
PAUL H. BROOKS,
BY Barkelew & Lewis Jan. 18, 1966 P. H. BROOKS 3,229,304
ARCHERY FINGER GUARD
Filed Jan. 7, 1964 2 Sheets-Sheet 2
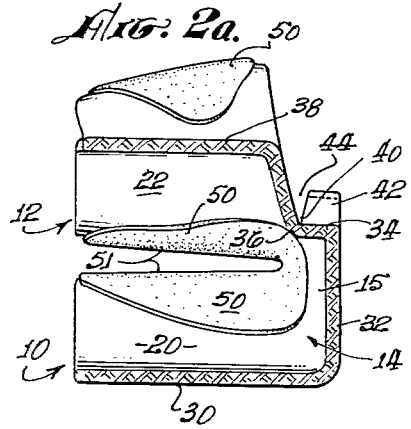
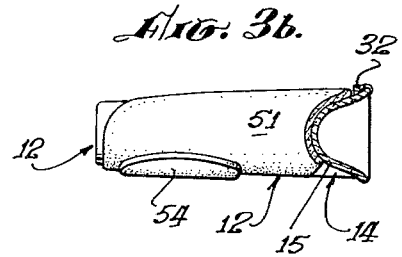
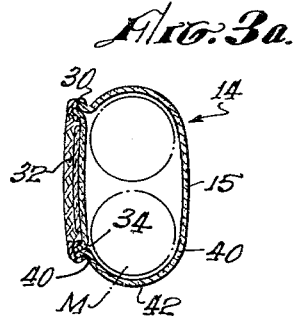
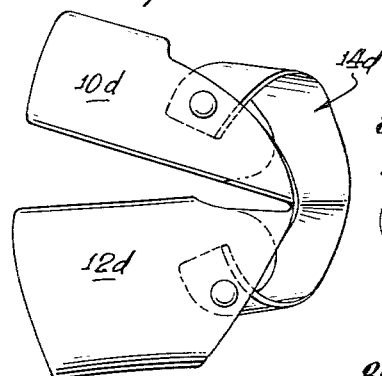
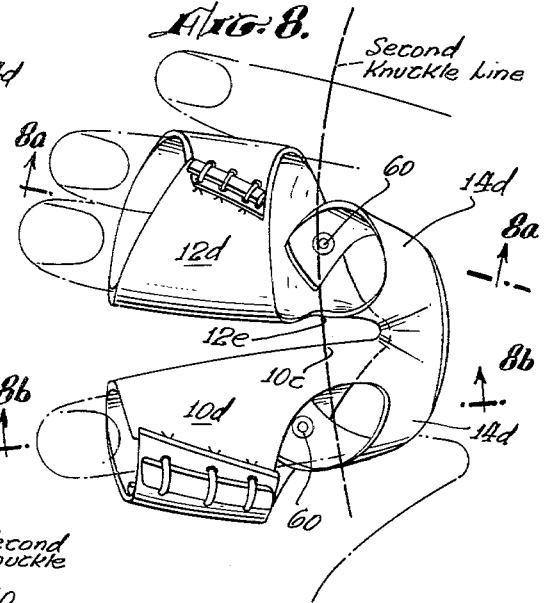
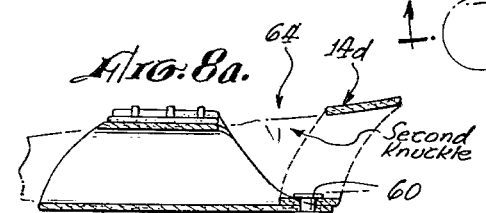
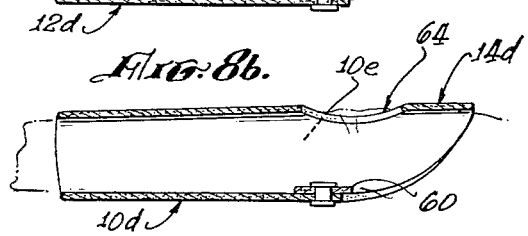
PAUL H. BROOKS,
INVENTOR.
By Beukelew & Lewis

3,229,304
ARCHERY FINGER GUARD
Paul H. Brooks, 2339 Treelane Ave., Monrovia, Calif.
Filed Jan. 7, 1964, Ser. No. 336,209
8 Claims. (Cl. 2—21)

The present invention, relating to finger guards for use in archery, has as its general objective the provision of a guard in simple, effective form that will effectivly protect the string-engaging fingers from abrasion and will, without the aid of harnessing to the user's hand or wrist, remain in proper position for use.

One of the characteristics of the guard of the invention lies in a flexible band encompassing at least one finger and preferably the first and second, or middle, fingers inward of its or their second joints—in general, between their second and third joints—and flexibly connected with stalls for a plurality of fingers, preferably the first, middle and third fingers in such manner as to allow those string-engaging fingers full joint flexibility to properly engage, hold and release the bow string. In archery performance, those three fingers are flexed not only at their first joints where the string is engaged, but also at their second joints. Flexure at the second joints prevents the stall-holding band from slipping outwardly off the fingers.

Another and preferable feature of the invention lies in the provision of a single finger stall for the first finger, a single stall encompassing both the middle and third fingers, and the stall holding band, flexibly connected with them, encompassing preferably only the first and middle fingers.

For definiteness in description and in the following claims, the finger closest to the thumb is here referred to as the first finger, the next finger as the middle or second finger, and the next, closest to the little finger, as the third finger. The finger joints closest to the finger tips are referred to as the first or outer joints, those next inward toward the palm as the second joints, and those at the palm of the hand as the third or inner joints. In general, in this description, outward means toward the finger tips from the palm. Inner as applied to the sides or faces of the guard and stalls, means that side or face worn at the inner, string engaging, finger faces, and lateral means transverse of the finger or stall lengths.

Each of the string engaging stall faces may be reinforced or stiffened in various and any suitable manners. The stall bodies, as well as the retaining band, are preferably composed primarily of a rather soft and flexible material, typically a soft flexible leather. The inner, string engaging stall faces may then be stiffened or reinforced, particularly at the points or lines of string engagement, in various manners, some of which are shown in the drawings. The stall holding band, as well as each of the two stalls, may have their bodies composed of separate pieces, or of a single piece, of flexible material, flexibly interconnected.

Typical forms illustrative of the invention are shown in the accompanying drawings, in which:

FIG. 1 is a perspective, looking at the inner face of one form of the guard as it appears on a right hand;

FIG. 2 is an inner plan of the same form;

FIG. 2a is an outer plan of the same form;

FIGS. 3, 3a and 3b are sections respectively on lines 3—3, 3a—3a and 3b—3b, FIG. 2;

FIGS. 4, 5 and 6 are perspectives of typical variant forms looking at their inner faces;

FIG. 7 is an inner plan of another form;

FIG. 8 is an outer plan of the form of FIG. 7; and

FIGS. 8a and 8b are sections on lines 8a—8a, 8b—8b of FIG. 8.

The drawings show the finger guard of the invention designed for the right hand of the user. Design for the left hand of a left-hander archer will be obvious.

Referring first to FIGS. 1 to 3b, the general location of the first joint of the first, middle and third fingers is indicated in FIG. 1 by the bow string, so labelled, and the general location of the second and third joints of those fingers by the lines labelled "line of second joints" and "line of third joints." In FIG. 2 the line of the first joints lies approximately on the line 3—3; that of the second joints approximately at the line 3a—3a where the finger encircling band joins the finger stalls.

In these figures the numeral 10 generally designates the stall for the first finger F, and 12 the stall for the middle and third fingers M and T. The flexible band encircling the first and middle fingers is generally designated 14. As will be pointed out later, that band, extending inwardly from about the line 3a—3a of FIG. 2, or the line of second joints in FIG. 1, may either be formed separately from the finger stalls and flexibly attached to them, or flexibly attached to them by being integrally formed of the same piece or pieces of flexible material as the body or bodies of the stalls. FIGS. 1 to 3b show the front and back faces of the bodies of the two stalls formed each of a single piece of flexible material with the band formed integrally with that piece. That piece of flexible material forms the body 20 of stall 10, the body 22 of stall 12, and the flexible band 14. The edges of that piece of material are joined together by a heavy stitching forming a welt. That welt stitching along the length of the first finger stall 10 and continued for the width of band 14 is indicated at 30. Welt stitching 30 is continued as at 32, along the back edge of band 14, and then outwardly as at 34 (FIG. 2a) to the point 36 at which the band joins the rear of body 22 of the stall 12 and then outwardly along the length of that stall 12, as at 38. As shown in FIGS. 1, 2, 3a and 3b, band 14 has its flexible body 15 formed as an inner continuation of body 20 of stall 10 and, in part, as a continuation of the body part 22 of stall 12 that lies next to stall 10. At points such as labelled 40 in FIGS. 1 and 3a, and 36 in FIG. 2a, integration or connection of the band body with body 22 of stall 12 terminates and the band completes its finger encircling at 42 with a gap at 44 between band portion 42 and body 22 of stall 12. The band is flexibly connected with the inner end of first finger stall 10 due to the flexibility of the body material, and flexibly connected with the inner end of the two-finger stall 12 not only because of the material flexibility but also because that portion of stall 12 that takes the third finger has no direct connection with the band. The band, bent at its connection line at the second joints of the first and middle fingers and having its portion 42 free of connection, at the second joint line, with the portion of stall 12 that takes the third finger, is held quite securely against slipping outwardly on the fingers by the bends at the second joints. The stalls are consequently held in proper positions on the several fingers.

The stiffening of band 14 by the run of the heavy stitched welt at 32 along its back edge assists in holding the band and stalls in their proper postions. Also the fact that the band preferably encompasses a plurality of contiguous fingers assists in that function. Although, as previously indicated, the band might encompass only one finger, the fact that it encompasses at least two contiguous fingers assist in that function because of seperative spreading of the contiguous fingers.

The inner, string engaging faces of the several stalls may be stiffened, padded or reinforced in any suitable manners.

FIGS. 1 to 3b show one type of stall-stiffening and padding. In those figures, a piece 50 of material also somewhat flexible like a somewhat stiffer piece of leather is cemented to the inner stall faces as shown in FIGS. 1, 2 and 3, and extended around the contiguous faces of those stalls, as at 51, to provide extra thickness at the stall faces between the first and second fingers where the arrow is held. Then, localized pads 54 of heavier harder leather are cemented to the inner faces of 50 along the line of the first finger joints and bow-string engagement.

FIG. 4 shows a variation in which the localized pads 54a are elongated to the lengths of the stalls 10 and 12.

FIG. 5 shows a form in which the reinforcings 50a are in separate pieces for the two stalls 10 and 12, and also shows a stall stiffening and reinforcing piece of two lengths 50b cemented to the stall bodies or to 50a and lying on the contiguous faces of the two stalls where the arrow is held between them.

FIG. 6 shows another form of stiffening and reinforcement similar to the form of FIG. 5 but wherein the two cemented lengths 50b are extended and bent to return, as at 50c, cemented to the inside faces of the stalls 10 and 12.

FIGS. 7 to 8b show another form in which the two-finger encircling band 14d is only connected with the two stalls 10d and 12d at their contiguous faces at 10e and 12e and at their inner, string-engaging faces. Connections of band 14d with those inner faces is here shown as by riveting at 60. At the inner ends of the stalls, between their outer faces and the band 14d, open spaces designated 64 are left for the second knuckles or joints. This is shown, for instance, in FIGS. 8 and 8a. The second knuckles of the first and second fingers are thus left quite freely to bend; and the band 14d, encircling the first and second fingers inward of their second joints is securely held in place and holds the stalls securely in place. The stalls here may be reinforced or padded in any desired and suitable manner.

I claim:

1. In a finger protector for use in archery and the like, the combination of:
   a plurality of finger stalls with inner faces adapted to cover the inner faces of a plurality of adjacent fingers approximately at the first joints of said fingers and of lengths adapted to extend inwardly approximately to the second joints of said fingers,
   and a laterally extending finger encircling band flexibly connected at its outer edge with the inner ends of at least two of said finger stalls at a lateral line adapted to lie approximately at the second joints of said fingers, said band thereby being adapted to encompass at least one of said fingers inwardly from its second joint.

2. The combination defined in claim 1 and in which said encompassing band is in its lateral extent adapted to surround the first and second fingers inward of their second joints.

3. The combination of claim 1 and in which the plurality of the finger stalls includes one stall of a lateral size adapted to surround the first finger only, and another stall of larger lateral size adapted to take both the second and third fingers.

4. The combination defined in claim 3 and in which said encompassing band is in its lateral extent adapted to surround the first and second fingers inward of their second joints.

5. The combination defined in claim 1 in which said stalls have outer as well as inner faces and in which said encompassing band is connected only with the inner faces of the finger stalls, leaving openings between the inner edges of the stall outer faces and the outer edge of said band.

6. The combination defined in claim 5 and in which said encompassing band is in its lateral extent adapted to surround the first and second fingers inward of their second joints.

7. The combination of claim 5 and in which the plurality of the finger stalls includes one stall of a lateral size adapted to surround the first finger only, and another stall of larger lateral size adapted to take both the second and third fingers.

8. The combination defined in claim 7 and in which said encompassing band is in its lateral extent adapted to surround the first and second fingers inward of their second joints.

References Cited by the Examiner
UNITED STATES PATENTS 2,773,264  12/1956  Nover _____ 2—159
2,974,319  3/1961   Wilson et al. _____ 2—21

JORDAN FRANKLIN, *Primary Examiner.*

RICHARD J. SCANLAN, *Assistant Examiner.*